United States Patent [19]

Schimmel et al.

[11] Patent Number: 4,525,333

[45] Date of Patent: Jun. 25, 1985

[54] PROCESS FOR SEPARATING GALLIUM AND INDIUM FROM AQUEOUS SOLUTIONS

[75] Inventors: Günther Schimmel; Gero Heymer, both of Erftstadt; Werner Kraüse, Hürth; Werner Pieper, Erftstadt, all of Fed. Rep. of Germany

[73] Assignee: Hoechst Aktiengesellschaft, Fed. Rep. of Germany

[21] Appl. No.: 531,156

[22] Filed: Sep. 9, 1983

[30] Foreign Application Priority Data

Sep. 23, 1982 [DE]  Fed. Rep. of Germany ....... 3235136

[51] Int. Cl.$^3$ ............................................. C01G 15/00
[52] U.S. Cl. ................................. 423/112; 75/101 BE
[58] Field of Search .................... 423/112; 75/101 BE

[56] References Cited

U.S. PATENT DOCUMENTS 4,292,284  9/1981  Tomii et al. ......................... 423/112

FOREIGN PATENT DOCUMENTS 148737  11/1980  Japan ................................... 423/112

OTHER PUBLICATIONS

Blake et al., "Proceedings of International Conf. on Peaceful Uses of Atomic Energy", vol. 28, 1958, Geneva, pp. 289-298.

Herak et al., "Proceedings of Inter. Solvent Extraction Conf., ISEC 71", vol. 1, Soc. of Chemical Industry, 1971, pp. 656-663.

Martella et al., "Chem. Absts.", vol. 90, 1979, #157807z.

*Primary Examiner*—H. T. Carter
*Attorney, Agent, or Firm*—Connolly and Hutz

[57] ABSTRACT

The disclosure relates to a process for separating gallium and indium from an aqueous solution by subjecting this latter to liquid/liquid extraction with the use of certain classes of organylphosphonic acid esters and separating the resulting liquid phases from one another.

10 Claims, No Drawings

PROCESS FOR SEPARATING GALLIUM AND INDIUM FROM AQUEOUS SOLUTIONS

The present invention relates to a process for separating gallium and indium from aqueous, especially mineral acid solutions, e.g. from hydrochloric, nitric or sulfuric acid solutions, by subjecting the solutions to liquid/liquid extraction by means of organylphosphonic acid esters and separating the resulting liquid phases from one another.

It is known art that gallium can be extracted from an aqueous solution by means of a complex former. Gallium is more particularly extractible in good yields from strong hydrochloric acid solutions with the aid of tri-n-octylphosphine oxide (TOPO) (Y. Hasegawa, J. Inorg. nucl. Chem. 47, 1487 (1980)) or tributyl phosphate (A. de Schepper, Hydromet. 4, 285 (1979)).

It is also known that gallium can be extracted from strongly basic solutions by means of alkenylhydroxyquinolines (cf. German Patent Specifications De-OS No. 25 30 880 and DE-OS No. 29 21 061).

It has also been described that indium can be extracted e.g. from sulfuric acid solution by means of di(2-ethylhexyl)phosphoric acid (DEHPA) (cf. European Patent Specification EP-A-O 008 992) or by means of a mixture of dialkyl and trialkylphosphoric acid esters (cf. U.S. Pat. No. 4,292,284).

Despite this, the art has been in need of suitable extractants permitting gallium to be extracted in high yields from mineral acid solutions, especially from solutions containing relatively little chloride. The art is also in need of extractants suitable for use in moderately alkaline media.

Although the extraction of indium from sulfuric acid solutions has already been described, it is highly desirable to have an extractant permitting the extraction to be effected with particularly high yields.

Indeed, it has already been suggested that phosphonic acid derivatives should be used as extractants for gallium, but the yields obtained heretofore have been unsatisfactory. More specifically, methylene, diphosphonates, carbamoyl phosphonates and carbamoylmethylene diphosphonates have, for example, been tried as extractants whose preparation incidentally is very expensive (cf. C.A. 90, 157 807 z 1979).

We have now unexpectedly found that the separation of gallium and indium from aqueous solutions, especially from mineral acid or moderately alkaline solutions, by subjecting the solutions to liquid/liquid extraction can be considerably improved by using as an organylphosphonic acid ester either (a) compounds of general formula I

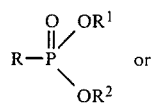

or (b) mixtures consisting of compounds of general formula II

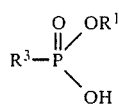

and up to 90% of compounds of general formula III

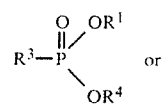

or (c) mixtures consisting of compounds of general formulae I, II and III, respectively, in which formulae R stands for a radical of the following formula

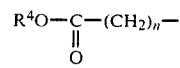

$R^1$, $R^3$ and $R^4$ each stand for identical or different alkyl, cycloalkyl or aryl groups having from 2 to 20, preferably from 5 to 10 carbon atoms, n stands for a whole number within the range 0 to 4, and $R^2$ has the same meaning as $R^1$, $R^3$ and $R^4$, or stands for hydrogen.

The organylphosphonic acid esters should preferably be used in the form of solutions in inert organic solvents, the useful organic solvents comprising hydrocarbons, e.g. kerosene. For reasons of economy, and in order to ensure good phase separation it is good practice to use solutions containing 2 to 30 weight %, preferably 10 to 20 weight % organylphosphonic acid ester.

The extractants used in accordance with this invention permit the desirable materials to be extracted in very good yields from weak and moderately strong acids. Gallium and indium are, for example, extracted almost quantitatively from 1N sulfuric acid, whilst DEHPA, for example, fails to extract gallium and extracts indium in less good yields. As compared with TOPO or tributyl phosphate (TBP), for example, the present extractants prermit gallium and indium to be better extracted from 1.4N-hydrochloric acid. Even in moderately basic solutions, the novel extractants effect higher distribution coefficients for gallium than the art-recognized substance class of the substituted hydroquinolines.

The present process also has a remarkable selectivity for other elements, e.g. zinc or aluminum.

In the following Examples representative extractants of the present invention are compared with known extractants. The present extractants are shown therein to be highly effective. Needless to say the invention is not limited to the specific extractants used. The numerical results obtained are indicated in the Table hereinafter.

EXAMPLES 1 AND 2

5N sulfuric acid which contained 200 ppm each of gallium and zinc was intensively mixed for 20 minutes in a ratio by volume of aqueous phase A to organic phase O = 1:1 with a 20% solution of a mixture consisting of equal parts of octylphosphonic acid mono- and dihexyl esters (I) and of (2-ethylhexoxycarbonyl)methanephosphonic acid-bis-(2-ethylhexyl)ester (II), respectively, dissolved in each case in kerosene. Next, the contents of Ga and Zn in the aqueous phase were determined.

EXAMPLES 3 AND 4

1N-sulfuric acid which contained 400 ppm each of gallium, zinc, indium and aluminium was extracted as described in Examples 1 and 2.

EXAMPLES 5 AND 6 (Comparative Examples)

The sulfuric acid solution of Examples 3 and 4 was intensively mixed for 20 minutes with a 20% solution of DEHPA (III) or octylphosphonic acid dibutylester (IV) in kerosene, the ratio by volume of phase A to phase O being 1:1. Next, the extraction yields were determined.

EXAMPLES 7 AND 8

A 0.2N-sulfuric acid solution which contained 200 ppm each of gallium, zinc and indium was extracted in a ratio by volume of phase A to phase O of 10:1 with a 20% solution of (2-ethylhexoxycarbonyl)methanephosphonic acid-bis(2-ethylhexyl)ester (II) and (2-ethylhexoxycarbonyl)phosphonic acid-bis(2-ethylhexyl)ester (V), respectively, and the extraction yields were determined.

EXAMPLES 9 AND 10

1.4N-hydrochloric acid which contained 400 ppm each of gallium, zinc, indium and aluminum was extracted with a 20% solution of I and II, respectively, in a ratio of phase A to phase O of 1:1, and the extraction yields were determined.

EXAMPLES 11 AND 12

0.25N-hydrochloric acid which contained 200 ppm each of zinc, gallium and indium was extracted as described in Examples 9 and 10 with I and II, respectively.

EXAMPLES 13, 14 AND 15 (Comparative Examples)

The procedure was as in Examples 11 and 12 but the extractants used were tri-n-octylphosphine oxide (VI), octylphosphonic acid-bis(2-ethylhexyl)ester (VII) and bis-(2-ethylhexyl)carbamoyl-methanephosphonic acid diethylester (VIII), respectively.

EXAMPLES 16, 17 AND 18

0.25N-sodium hydroxide solution which contained 200 ppm gallium was extracted with a 20% solution of I, II and alkenylhydroxy quinoline (IX), respectively in a ratio of phase A to phase O of 1:1 and the extraction yields were determined.

the resulting liquid phases from one another, the improvement which comprises: using as the extraction solvent either (a) a mixture consisting essentially of a compound of general formula I

and up to 90% of a compound of general formula II

or (b) a compound of formula III

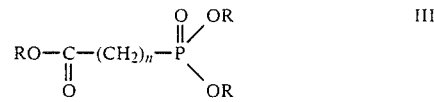

or a mixture consisting essentially of a compound of formula III with a said mixture of compounds of formulae I and II, in which R stands for an identical or different unsubstituted alkyl, cycloalkyl or aryl group having from 2 to 20 carbon atoms and n stands for a whole number within the range 0 to 4.

2. The process as claimed in claim 1, wherein the organylphosphonic acid ester is used in the form of a solution in an inert organic solvent.

3. The process as claimed in claim 2, wherein the organic solvent is a hydrocarbon.

4. The process as claimed in claim 2, wherein the solvent is kerosene.

5. The process as claimed in claim 2, wherein a solution containing 2 to 30 weight % organylphosphonic acid ester is used.

|         |            | ppm before extraction |     |     |     | ppm after extraction |     |     |     | yield in % |       |      |      |
|---------|------------|-----|-----|-----|-----|-----|-----|-----|-----|-------|-------|------|------|
| Example | Extractant | Ga  | In  | Zn  | Al  | Ga  | In  | Zn  | Al  | Ga    | In    | Zn   | Al   |
| 1       | I          | 200 | —   | 200 | —   | 70  | —   | 200 | —   | 65.0  | —     | 0    | —    |
| 2       | II         | 200 | —   | 200 | —   | 120 | —   | 200 | —   | 40.0  | —     | 0    | —    |
| 3       | I          | 400 | 400 | 400 | 400 | 40  | <5  | 400 | 50  | 90.0  | >98.8 | 0    | 87.5 |
| 4       | II         | 400 | 400 | 400 | 400 | 8   | <5  | 400 | 85  | 98.0  | >98.8 | 0    | 78.8 |
| 5       | III        | 400 | 400 | 400 | —   | 400 | 40  | 380 | —   | 0     | 90.0  | 5.0  | —    |
| 6       | IV         | 400 | 400 | 400 | 400 | 400 | 400 | 400 | 400 | 0     | 0     | 0    | 0    |
| 7       | II         | 200 | 200 | 200 | —   | <1  | <1  | 170 | —   | >99.5 | >99.5 | 15.0 | —    |
| 8       | V          | 200 | 200 | 200 | —   | <1  | <1  | 200 | —   | >99.5 | >99.5 | 0    | —    |
| 9       | I          | 400 | 400 | 400 | 400 | 65  | 130 | 200 | 160 | 83.8  | 67.5  | 50.0 | 60.0 |
| 10      | II         | 400 | 400 | 400 | 400 | 49  | 120 | 400 | 290 | 87.8  | 70.0  | 0    | 27.5 |
| 11      | I          | 200 | 200 | 200 | —   | <1  | 20  | 170 | —   | >99.5 | 90.0  | 15.0 | —    |
| 12      | II         | 200 | 200 | 200 | —   | <1  | 15  | 170 | —   | >99.5 | 92.5  | 15.0 | —    |
| 13      | VI         | 200 | 200 | 200 | —   | 190 | 170 | 7   | —   | 5.0   | 15.0  | 96.5 | —    |
| 14      | VII        | 200 | 200 | 200 | —   | 170 | 105 | 200 | —   | 15.0  | 47.5  | 0    | —    |
| 15      | VIII       | 200 | —   | 200 | —   | 100 | —   | 20  | —   | 50.0  | —     | 10.0 | —    |
| 16      | I          | 200 | —   | —   | —   | 1   | —   | —   | —   | 99.5  | —     | —    | —    |
| 17      | II         | 200 | —   | —   | —   | 1   | —   | —   | —   | 99.5  | —     | —    | —    |
| 18      | IX         | 200 | —   | —   | —   | 170 | —   | —   | —   | 15.0  | —     | —    | —    |

We claim:

1. In the process for separating gallium and indium from an aqueous solution by subjecting the solution to liquid/liquid extraction with the use of an organylphosphonic acid ester as extraction solvent and separating 6. The process as claimed in claim 1, wherein compounds are used in whose general formulae I, II and the substituent R stands for alkyl, cycloalkyl or aryl groups having from 5 to 10 carbon atoms.

7. The process as claimed in claim 1, wherein the extraction solvent consists essentially of said mixture of compounds of formulae I and II.

8. The process as claimed in claim 1, wherein the extraction solvent consists essentially of a compound of formula III.

9. The process according to claim 1, wherein the aqueous solution from which the gallium and indium are to be separated is acidic and contains a mineral acid.

10. The process according to claim 1, wherein the aqueous solution from which the gallium and indium are to be separated is alkaline.

* * * * *